US008976630B2

(12) United States Patent
Oshio

(10) Patent No.: US 8,976,630 B2

(45) Date of Patent: Mar. 10, 2015

(54) DIAL ASSEMBLY AND TIMEPIECE

(75) Inventor: Takumi Oshio, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 282 days.

(21) Appl. No.: 13/540,038

(22) Filed: Jul. 2, 2012

(65) Prior Publication Data

US 2013/0051192 A1 Feb. 28, 2013

(30) Foreign Application Priority Data

Aug. 31, 2011 (JP) ................................ 2011-189498

(51) Int. Cl.

*G04B 19/04* (2006.01)
*G05B 19/06* (2006.01)
*G04B 19/06* (2006.01)
*G04B 19/12* (2006.01)

(52) U.S. Cl.

CPC .............. *G04B 19/04* (2013.01); *G04B 19/065* (2013.01); *G04B 19/12* (2013.01)
USPC .............. 368/80; 368/205; 368/223; 368/228

(58) Field of Classification Search

USPC .............. 368/80, 88, 205, 223, 228, 232, 233
See application file for complete search history.

(56) References Cited

U.S. PATENT DOCUMENTS

| | | | | |
|---|---|---|---|---|
| 5,802,016 | A * | 9/1998 | Kubota et al. | 368/11 |
| 6,925,032 | B2 * | 8/2005 | Willemin et al. | 368/28 |
| 7,072,246 | B2 * | 7/2006 | Lizzi | 368/10 |
| 7,656,752 | B2 | 2/2010 | Arita et al. | |
| 8,144,547 | B2 * | 3/2012 | Plancon et al. | 368/10 |
| 2009/0080294 | A1 * | 3/2009 | Arita et al. | 368/232 |
| 2013/0051193 | A1 * | 2/2013 | Sato | 368/205 |

FOREIGN PATENT DOCUMENTS

| | | |
|---|---|---|
| JP | 2009-074880 A | 4/2009 |
| JP | 2010-145206 A | 7/2010 |

* cited by examiner

*Primary Examiner* — Vit W Miska
(74) *Attorney, Agent, or Firm* — Global IP Counselors, LLP

(57) ABSTRACT

A dial assembly held within a timepiece case together with a movement for which the hour hand and minute hand are supported to be able to rotate is provided. The movement supports at least one miniature hand to be able to rotate at a position different from the hour hand and minute hand. The dial assembly comprising includes a first dial that is light transmissive, a second dial arranged on the back surface side of the first dial, and at last one spacer forming a ring shape arranged between the first dial and the second dial. The miniature hand rotates within a space enclosed by the first dial, the second dial, and the spacer.

12 Claims, 5 Drawing Sheets

DIAL ASSEMBLY AND TIMEPIECE

CROSS-REFERENCE TO RELATED APPLICATIONS

This application claims priority to Japanese Patent Application No. 2011-189498 filed on Aug. 31, 2011. The entire disclosure of Japanese Patent Application No. 2011-189498 is hereby incorporated herein by reference.

BACKGROUND

1. Technical Field

The present invention relates to a dial assembly and a timepiece.

2. Background Technology

Known from the past are wrist watches equipped with two dials arranged via a gap, and a movement for which an hour hand, minute hand, and second hand are supported with rotation movement (see Patent Document 1, for example). With the wrist watch noted in this Patent Document 1, an alignment pin for regulating the positional relationship (height relationship) of the two dials to each other is fixed to the movement. Specifically, with the wrist watch noted in Patent Document 1, the mutual positional relationship of the two dials is regulated via an alignment pin fixed to the movement. For that reason, the constitution is such that the size of the gap (gap length) between the two dials is fixed (unchanging).

To apply the wrist watch noted in Patent Document 1 to a chronograph having another miniature hand other than the hour hand, minute hand, and second hand, for example, there are cases of arranging the miniature hand in a gap between the two dials. However, in that case, depending on the miniature hand position (height), there are cases as described previously when the size of that gap is fixed and cannot be changed, and as a result, there is the problem that the miniature hand could not be arranged within the gap.

Japanese Laid-open Patent Application No. 2010-145206 (Patent Document 1) is an example of the related art.

SUMMARY

Problems to Be Solved by the Invention

An advantage of the invention is, using a simple constitution, to provide a dial assembly for which it is possible to reliably form a space in which miniature hands rotate according to the position of the miniature hands, and a timepiece equipped with that dial assembly.

Means Used to Solve the Above-Mentioned Problems

Such an advantage is achieved by the invention as noted hereafter.

The dial assembly of the invention is a dial assembly held within a timepiece case together with a movement for which the hour hand and minute hand are supported to be able to rotate, which supports at least one miniature hand to be able to rotate at a position different from the hour hand and minute hand, the dial assembly including a first dial that is light transmissive, a second dial arranged on the back surface side of the first dial, and at last one spacer forming a ring shape arranged between the first dial and the second dial, wherein the miniature hand rotates within a space enclosed by the first dial, the second dial, and the spacer.

As a result, with a simple constitution, it is possible to reliably form a space for the miniature hand to rotate according to the position of the miniature hand.

With the dial assembly of the invention, preferably, the spacer has a step part of a different thickness, and the first dial is placed on that step part.

As a result, it is possible to make the dial assembly relatively thin.

With the dial assembly of the invention, preferably, with the first dial, the hour hand and the minute hand fulfill indicating functions, and with the second dial, the miniature hands fulfill indicating functions.

As a result, it is possible to confirm the time according to the positions respectively indicated by the hour hand and minute hand. Also, when the second dial has the function of displaying the day of the week, for example, it is possible to confirm the day according to the position indicated by the miniature hand.

With the dial assembly of the invention, preferably, the movement is an item that respectively supports the two miniature hands to be able to rotate, and the second dial includes a first display part for which one miniature hand of the two miniature hands performs indicating, and a second display part for which the other miniature hand performs indicating.

As a result, for example it is possible to use one of either the first display part or the second display part as the 24-hour display, and to use the other as the day display.

With the dial assembly of the invention, preferably, on the first dial, on the part that the first display part faces, a first opening part is formed piercing that concerned part, and on the part that the second display part faces, a second opening part is formed piercing that concerned part.

As a result, it is possible to visually recognize the first display part and one miniature hand via the first opening part, and to visually recognize the second display part and the other miniature hand via the second opening part.

With the dial assembly of the invention, preferably, within the case, a solar battery is arranged on the back surface side of the second dial, and the second dial is light transmissive.

As a result, the light that is transmitted through the first dial is further transmitted through the second dial, and thus, light is received by the solar battery.

The dial assembly of the invention preferably includes a ring member arranged on the front side of the first dial, and forming a ring shape along the edge part of the first dial.

As a result, for example, it is possible to add a scale to the ring member, and to use that ring member as part of a holding tab.

With the dial assembly of the invention, preferably, within the case, on the back surface side of the second dial, a solar battery having a light receiving surface for receiving light is arranged, and the light receiving surface is divided into a plurality of areas, and at least one of the first dial, the second dial, the spacer, and the ring member has a mask part that in plan view overlaps the boundary part of adjacent areas.

As a result, it is possible to hide the boundary part, and thus, to improve the aesthetics of the timepiece.

The dial assembly of the invention preferably includes regulating means for regulating the mutual positional relationships of the first dial, the second dial, the spacer, and the movement.

As a result, it is possible to reliably mutually fix the members including the first dial, the second dial, the spacer, and the movement, and to reliably prevent them from slipping when using the timepiece.

The timepiece of the invention includes the dial assembly of the invention, a movement for which the hour hand and minute hand are supported to be able to rotate, which supports at least one miniature hand to be able to rotate at a position different from the hour hand and minute hand, and a case in which the dial assembly and the movement are held.

As a result, with a simple constitution, it is possible to reliably form a space for the miniature hand to rotate according to the position of the miniature hand.

With the invention, with a simple constitution, it is possible to provide a dial assembly for which it is possible to reliably form a space for the miniature hand to rotate according to the position of the miniature hand, and a timepiece in which that dial assembly is equipped.

BRIEF DESCRIPTION OF THE DRAWINGS

Referring now to the attached drawings which form a part of this original disclosure.

DETAILED DESCRIPTION OF EXEMPLARY EMBODIMENTS

Figure 1:
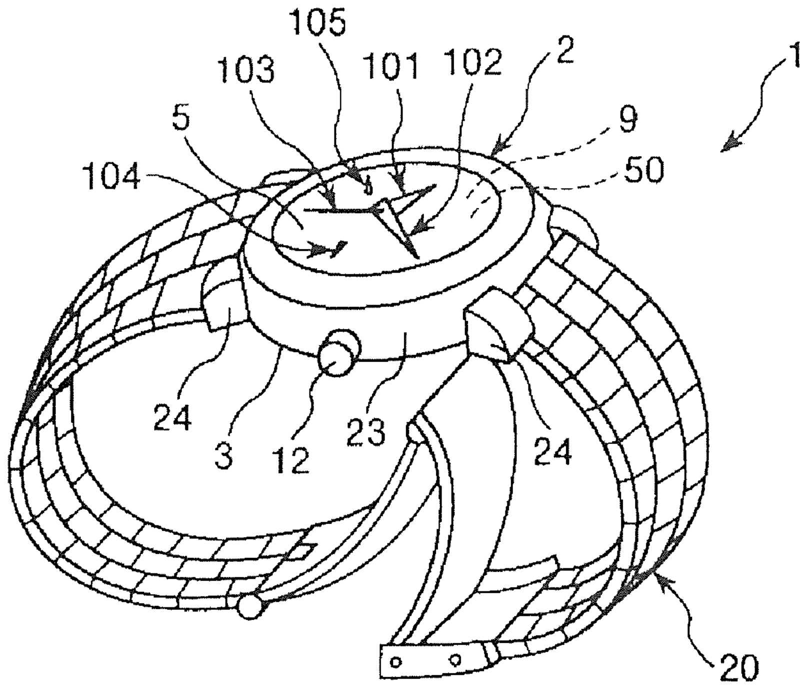
FIG. 1 is a perspective view showing a first embodiment when the timepiece of the invention equipped with the dial assembly of the invention is applied to a wrist watch.

Following, we will give a detailed description regarding preferred embodiments of the dial assembly and timepiece of the invention shown in the drawings.

First Embodiment

Figure 2:
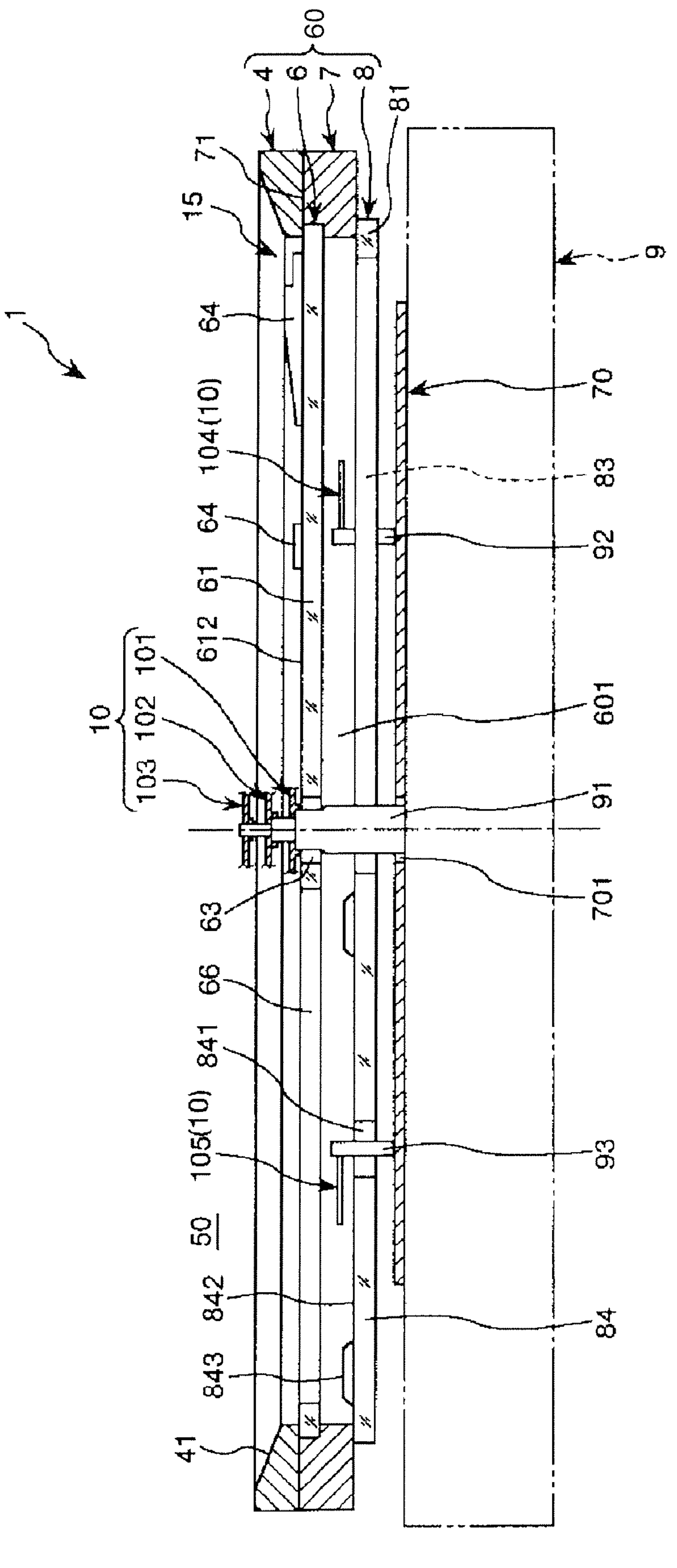
FIG. 2 is a cross section diagram of the wrist watch shown in FIG. 1.
Figure 3:
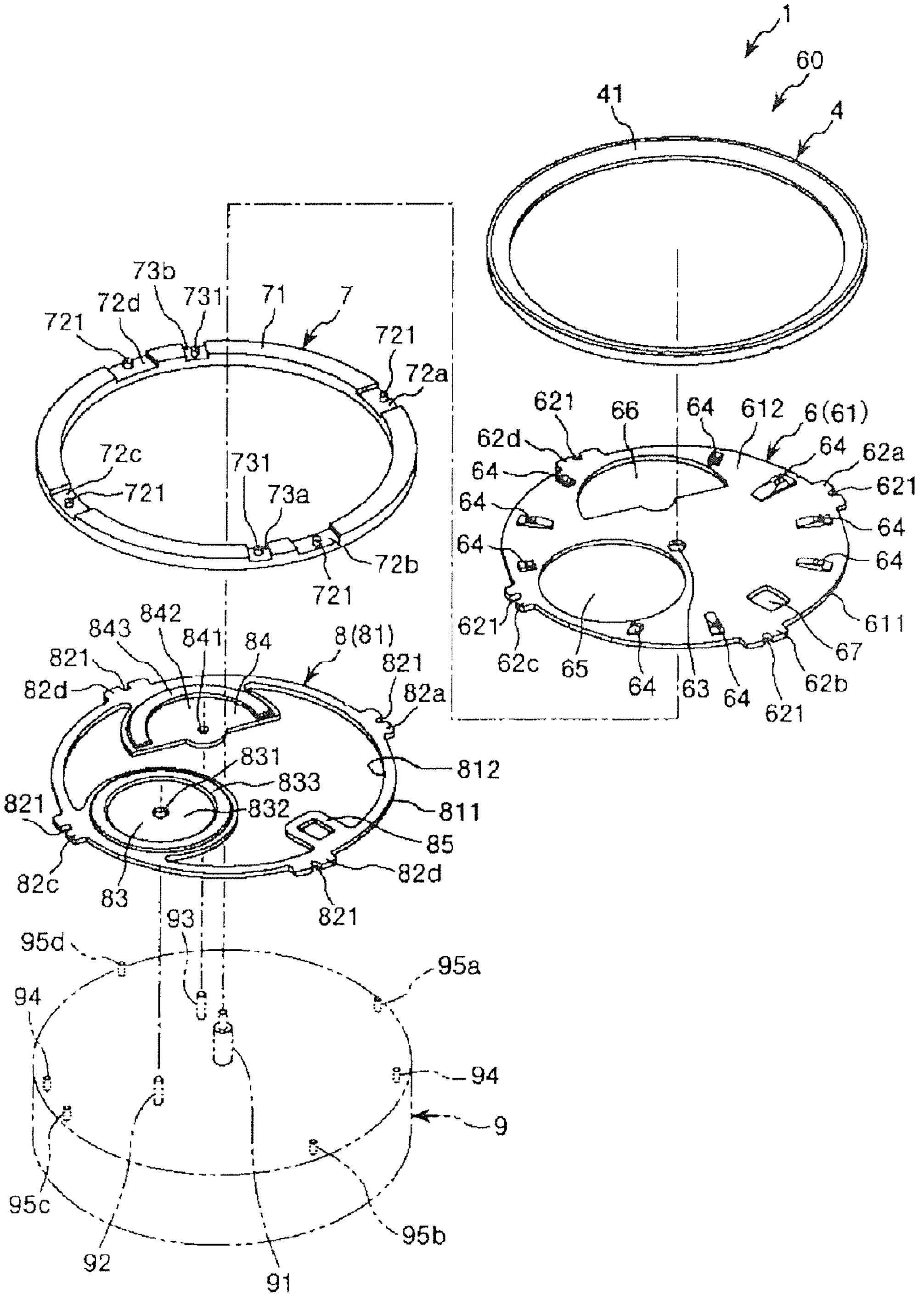
FIG. 3 is an exploded perspective view of the dial assembly in FIG. 1 seen from the front side.
Figure 4:
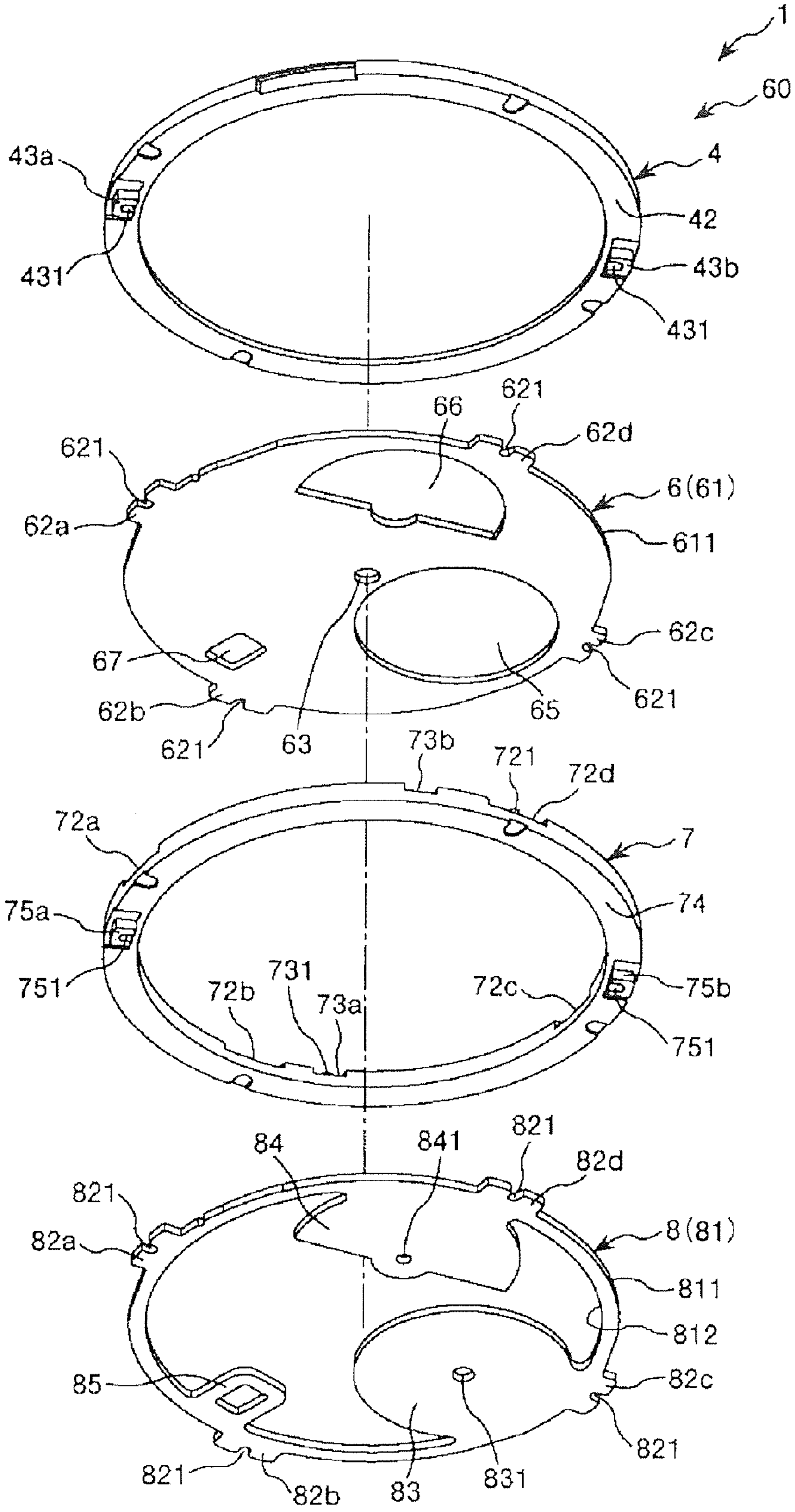
FIG. 4 is an exploded perspective view of the dial assembly in FIG. 1 seen from the back side.

FIG. 1 is a perspective view showing a first embodiment when the timepiece of the invention equipped with the dial assembly of the invention is applied to a wrist watch. FIG. 2 is a cross section diagram of the wrist watch shown in FIG. 1. FIG. 3 is an exploded view of the dial assembly in FIG. 1 seen from the front side. FIG. 4 is an exploded perspective view of the dial assembly in FIG. 1 seen from the back side. Hereafter, according to the descriptive circumstances, in FIG. 1 through FIG. 4 (also the same for FIG. 5), the top side is referred to as "top," "above" or "front," and the bottom side is referred to as "bottom," "below," or "back."

The wrist watch 1 shown in FIG. 1 (hereafter referred to simply as "watch") is equipped with a body (case) 2, a back cover 3, a cover glass (watch crystal) 5, and a band 20. Also, as shown in FIG. 2, in sequence from the side at which the cover glass 5 is provided, the dial assembly 60, the solar battery 70, and the movement 9 are held in the watch 1 internal space 50 (space enclosed by the body 2, the back cover 3, and the cover glass 5). Also, the hour hand 101, the minute hand 102, and the second hand 103, which constitute the indicator (hand) 10, are supported to be able to rotate on the movement 9. On the indicator 10, in addition to the hour hand 101, the minute hand 102, and the second hand 103, there are a 24-hour hour hand (miniature hand) 104 and a day hand (miniature hand) 105, and the 24-hour hand 104 and the day hand 105 are also supported to be able to rotate on the movement 9. The indicator 10 is held within the internal space 50 of the watch 1. Following, we will describe the constitution of each part.

As shown in FIG. 1, the body 2 is constituted by an annular member. At the front side part of this body 2, the cover glass 5 is mounted and fixed to be air tight and liquid tight, and on the back side part, the back cover 3 is mounted and fixed to be air tight and liquid tight. As a fixing method for the cover glass 5, though not specifically restricted, an example would be a method using adhesion (adhesion using an adhesive agent or solvent), or the like. Also, as a fixing method for the back cover 3, though not specifically restricted, examples include a method using a method of screwing together, a method of fitting, or the like.

A winding stem (not illustrated) is fit into the outer circumference part 23 of the body 2, and a crown 12 is provided to be able to rotate on the winding stem. By doing a rotation operation of the crown 12, the torque is transmitted to the movement 9. As a result, the indicator 10 is rotationally driven, and thus, it is possible to adjust the displayed time. Also, at both sides via the center axis, lugs 24 are provided as connector parts by which the band 20 is connected to the outer circumference part 23 of the body 2. The band 20 is used when wearing the watch 1 on the arm.

The cover glass 5 forms a round disk shape, and is constituted from a transparent member. Note that a "transparent member" means an item having transparency for which the visible light transmission rate is about 50% or greater. Also, "transparent" includes transparency with color (colored) in addition to colorless transparency. As the constituent material of the cover glass 5, though not specifically restricted, for example inorganic glass or the like can be used. As the constituent material of the cover glass 5, though not specifically restricted, for example inorganic glass or the like can be used. As this inorganic glass, examples include soda lime glass, borosilicate glass, Hardrex (inorganic tempered glass), Clearex (non-reflective treated), spinel glass, sapphire glass or the like. For inorganic glass, since the material strength (strength) is high, for example it is possible to reduce deformation and breaking due to pressure or impact, and to make it so that it does not scratch easily and also has good specularity. As a result, the strength of the cover glass 5 itself is high, and it is possible to improve visibility. Also, with inorganic glass, it is easily possible to perform adhesion using an adhesive agent, and thus, there is a wide range of selections of types of adhesive agent and adhesion method with which high adhesive strength can be obtained.

The back cover 3 is constituted with a round disk shaped member. It is also possible to interpose packing between the back cover 3 and the body 2. As a result, when the back cover 3 is mounted on the body 2, this packing is compressed, and it is possible to reliably maintain the air tight and liquid tight state between the back cover 3 and the body 2. As the constituent material for the body 2, the back cover 3, and the indicator 10, though not specifically restricted, examples include various metal materials such as stainless steel, titanium, and titanium alloys (including alloys), and various types of resin materials (plastic materials) and the like. Among these, metal materials are preferably used because they are excellent in terms of aesthetic aspect and strength. The body 2, the back cover 3, and the indicator 10 can be constituted using the same materials as each other, and can also be constituted using different materials.

A disk shaped movement 9 is also fixed on the back cover 3. As shown in FIG. 2, the movement 9 has a shaft 91 on which the hour hand 101, the minute hand 102, and the second hand 103 are rotationally supported, a shaft 92 on which the 24-hour hand 104 is rotationally supported, and a shaft 93 on which the day hand 105 is rotationally supported. The shaft 91 is arranged at the center part of the movement 9, and the shafts 92 and 93 are respectively arranged at different positions from the shaft 91, in other words separated from around the shaft 91.

This movement 9 has a built in mechanism that drives (rotates) the hour hand 101, the minute hand 102, and the second hand 103 via the shaft 91, drives the 24-hour hand 104 via the shaft 92, and drives the day hand 105 via the shaft 93 using power supplied from the solar battery 70. This mechanism is not specifically restricted, but examples that can be used include an electric double layer capacitor that stores electromotive force, a lithium ion secondary battery, a quartz oscillator as a time reference source, a semiconductor integrated circuit that generates a drive pulse for driving the watch based on the oscillating frequency of the quartz oscillator, a step motor for driving the indicator each second with the train wheel mechanism that receives this drive pulse, or an item equipped with the train wheel mechanism for transmitting the movement of the step motor to the indicator.

The disk shaped (plate shaped) solar battery 70 is arranged overlapping the movement 9. The solar battery 70 is electrically connected to the movement 9, generates power by receiving light, and can supply power to the movement 9. As the solar battery 70, for example, it is possible to use an item that overlaps and joins a p type semiconductor and an n type semiconductor. The p type semiconductor is an item which has a trace amount of trivalent element such as boron mixed in a high purity level silicon semiconductor, and the n type semiconductor is an item for which a trace amount of a quinquevalent element such as arsenic is mixed in a high purity level silicon semiconductor. When light is irradiated on a solar battery 70 with this kind of constitution, electrons and positive holes are generated within the silicon interior by the photoelectric effect. Also, at the pn junction which is the boundary part of the p type semiconductor and the n type semiconductor, of the generated electrons and positive holes, the positive holes having a plus charge are separated and conducted to the p type semiconductor side, and the electrons having a minus charge are separated and conducted to the n type semiconductor side. As a result, each semiconductor is charged to plus and minus, electric potential difference is generated, and thus, it is possible to supply power to the movement 9. Note that the vicinity of the pn junction is a depletion layer.

Also, on the solar battery 70, at positions corresponding to the shafts 91 to 93 of the movement 9, insertion holes 701 in which those shafts 91 to 93 are inserted are formed (see FIG. 2). As described previously, together with the movement 9 and the solar battery 70, the dial assembly 60 is held inside the internal space 50 (body 2). As shown in FIG. 2 to FIG. 4, the dial assembly 60 has a ring member (dial ring) 4, a first dial 6, a spacer 7, and a second dial 8, and is an item which is an assembly with these members assembled overlapping in that order from the front side.

Also, the assembled state is maintained on the dial assembly 60. Specifically, a regulating means 15 is provided for regulating the mutual positional relationship of the ring member 4, the first dial 6, the spacer 7, the second dial 8, and the movement 9. With this regulating means 15, the ring member 4, the first dial 6, the spacer 7, the second dial 8, and the movement 9 members are reliably fixed to each other, and it is possible to reliably prevent them from slipping while the watch 1 is being used. The constitution of the regulating means 15 will be described later.

As shown in FIG. 3 and FIG. 4, the first dial 6 has a round disk shaped main unit part (first main unit part) 61, and projecting pieces (first projecting pieces) 62*a*, 62*b*, 62*c*, and 62*d* formed projecting to the outside on the outer circumference part (edge part) 611 of the main unit part 61. With this first dial 6, the main unit part 61 and the projecting pieces 62*a* to 62*d* are formed as an integrated unit, and as a whole is light transmissive. As a result, when light is irradiated from the front side, that light can be transmitted through the first dial 6. This transmitted light is received by the solar battery 70. As the constituent materials, this is not specifically restricted, but for example, it is possible to use a plastic material constituted with materials including at least one type selected from polycarbonate (PC) and acrylonitrile butadiene styrene copolymer (ABS resin), and it is also possible to use soda glass or silica glass.

An insertion hole 63 in which the shaft 91 of the movement 9 is inserted is formed at the center part of the main unit part 61. By inserting the shaft 91 of the movement 9 into the insertion hole 63, the hour hand 101, the minute hand 102, and the second hand 103 supported on the shaft 91 are placed on the front side of the first dial 6 (reference 2). Also, a plurality of plate piece shaped display parts (scales) 64 having the function of displaying the time indicated by the hour hand 101, the minute hand 102, and the second hand 103 are arranged on the front side surface 612 of the main unit part 61. These display parts 64 are intermittently arranged along the circumference direction of the main unit part 61, and correlate to the times "1," "2," "4," "5," "7," "8," "9," "11," and "12." It is then possible to confirm the time by the position indicated at the respective display parts 64 by the hour hand 101, the minute hand 102, and the second hand 103.

Also, each display part 64 is respectively fixed to the main unit part 61. As this fixing method, though not specifically restricted, examples that can be used include a method using crimping, a method using fitting, a method using adhesion (adhesion using an adhesive agent or solvent) or the like. As the constituent material for each display part 64, though not specifically restricted, it is possible to us the same constituent materials as for the body 2, for example.

On the main unit part 61, a first opening part 65 is formed near the position correlating to the time "6," a second opening part 66 is formed near the position correlating to the time "10," and a third opening part 67 is formed near the position correlating to the time "3." The first opening part 65, the second opening part 66, and the third opening part 67 are respectively constituted by through holes piercing the main unit part 61 in its thickness direction.

Then, the first opening part 65 forms a circle in plan view, and faces the first display part 83 of the second dial 8. Via this first opening part 65, it is possible to visually recognize the first display part 83 and the 24-hour hand 104 supported on the shaft 92 of the movement 9. The second opening part 66 forms roughly a semicircle in plan view, and faces the second display part 84 of the second dial 8. Via this second opening part 66, it is possible to visually recognize the second display part 84 and the day hand 105 supported on the shaft 93 of the movement 9.

The third opening part 67 forms a quadrangle in plan view, and faces the "date" (not shown) displayed with the movement 9. Via this third opening part 67, it is possible to visually recognize the aforementioned date. The projecting pieces 62*a* to 62*d* are arranged at equal intervals along the circumference direction of the outer circumference part of the main unit part 61. Also, the projecting pieces 62*a* to 62*d* respectively form long plate pieces along the circumference direction of the outer circumference part of the main unit part 61. Then, on the projecting pieces 62*a* to 62*d* are respectively formed deficit parts 621 midway in the lengthwise direction. Each deficit part 621 has a pin 721 of a spacer 7 described later respectively inserted therein, and together with that pin 721, is a part that becomes a portion of the regulating means 15.

As shown in FIG. 3 and FIG. 4, the second dial 8 is arranged on the back surface side of the first dial 6. The second dial 8 has the annular main unit part (second main unit part) 81, projecting pieces (second projecting pieces) 82*a*, 82*b*, 82*c*, and 82*d* formed projecting to the outside on the outer circumference part (edge part) 811 of the main unit part 81, the first display unit 83, the second display unit 84, and the third display part 85 formed projecting to the inside of the inner circumference part 812 of the main unit part 81. With this second dial 8, the main unit part 81, the projecting pieces 82*a* to 82*d*, the first display part 83, the second display part 84, and the third display part 85 are formed as an integral unit, and as an entirety is light transmissive. As a result, the light that is transmitted through the first dial 6 can also be transmitted through the second dial 8, and light is received on the solar battery 70 arranged on the back surface side of that second dial 8. As the constituent materials of the second dial 8, though not specifically restricted, it is possible to use the same items as the constituent materials of the main unit part 61 of the first dial 6, for example.

The first display part 83 constitutes a plate shaped body that forms a circle in plan view. At the center part of this first display part 83 is formed an insertion hole 831 in which the shaft 92 of the movement 9 is inserted. By inserting the shaft 92 of the movement 9 in the insertion hole 831, the 24-hour hand 104 supported on the shaft 92 is placed on the front side of the first display part 83. On the front side surface 832 of the first display part 83, a rib 833 forming a ring shape is formed projecting along the circumference direction. The numbers "1" to "24" (not shown) are respectively attached on this rib 833. It is possible to confirm the time by the 24-hour hand 104 (one of the miniature hands) indicating any of these numbers.

The second display part 84 is constituted by a plate shaped body forming a semicircle in plan view. At the center of the arc of this second display part 84 is formed an insertion hole 841 in which is inserted the shaft 93 of the movement 9. By the shaft 93 of the movement 9 being inserted in the insertion hole 841, the day hand 105 supported on the shaft 93 is placed on the front surface of the second display part 84 (see FIG. 2). Also, a rib 843 forming an arc shape is formed projecting on the front side surface 842 of the second display part 84. The text "Mon," "Tue," "Wed," Thu," "Fri," "Sat," and "Sun" (not shown) are respectively attached on this rib 843. The day of the week can be recognized by the day hand 105 (the other miniature hand) indicating any of these text.

As shown in FIG. 2, the first display part 83 and the second display part 84 have mutually the same position in the thickness direction of the dial 9. As a result, for example it is possible to inhibit the overall thickness of the dial assembly 60, and as a result, it is possible to make the watch 1 relatively thin. The third display part 85 is constituted of a plate shaped body forming a frame shape in plan view. This third display part 85 is arranged so as to face the back surface side of the third opening part 67 of the first dial 6. Also, it is possible to visually recognize the "date" displayed with the movement 9 which is on the inner side via the sequence of the third opening part 67 of the first dial 6 and the third display part 85 of the second dial 8.

The projecting pieces 82*a* to 82*d* respectively form long plate pieces along the circumference direction of the outer circumference part of the main unit part 81. Then, on the projecting pieces 82*a* to 82*d* are respectively formed deficit parts 821 midway in the lengthwise direction. In the deficit part 821 of the projecting piece 82*a* is inserted the pin 95*a* fixed to the movement 9, in the deficit part 821 of the projecting piece 82*b* is inserted the pin 95*b* fixed to the movement 9, in the deficit part 821 of the projecting piece 82*c* is inserted the pin 95*d* fixed to the movement 9, and in the deficit part 821 of the projecting piece 82*d* is inserted the pin 95*d* fixed to the movement 9. As a result, the positional relationship of the second dial 8 and the movement 9 is regulated. In this way, each deficit part 821 is respectively a part that becomes part of the regulating means 15.

As shown in FIG. 2 to FIG. 4, the spacer 7 forming an annular ring (ring shape) is arranged between the first dial 6 and the second dial 8. As shown in FIG. 3, on the front side surface 71 of the spacer 7 are formed first step parts (step parts) 72*a*, 72*b*, 72*c*, and 72*d*, and second step parts 73*a* and 73*b*. The first step parts 72*a* to 72*d* are arranged at equal intervals along the circumference direction of the spacer 7. Also, the second step parts 73*a* and 73*b* are arranged at mutually opposite sides via the center axis of the spacer 7 at different positions from those of the first step parts 72*a* to 72*d*.

The first step parts 72*a* to 72*d* are respectively parts for which the spacer 7 thickness differs, in other words is decreased (lowered) by the thickness amount of the first dial 6. Then, the projecting piece 62*a* of the first dial 6 can enter (be placed) at the first step part 72*a*, the projecting piece 62*b* can enter at the first step part 72*b*, the projecting piece 62*c* can enter at the first step part 72*c*, and the projecting piece 62*d* can enter at the first step part 72*d*. As a result, by the front side surface 612 of the first dial 6 and the front side surface 71 of the spacer 7 being placed on the same surface, the dial assembly 60 is made thinner.

Also, pins 721 are formed projecting respectively at the first step parts 72*a* to 72*d*. The pin 721 of the first step part 72*a* is fit into (inserted in) the deficit part 621 of the projecting piece 62*a* of the first dial 6, the pin 721 of the first step part 72*b* is fit into the deficit part 621 of the projecting piece 62*b*, the pin 721 of the first step part 72*c* is fit into the deficit part 621 of the projecting piece 62*c*, and the pin 721 of the first step part 72*d* is fit into the deficit part 621 of the projecting piece 62*d*. As a result, the positional relationship of the first dial 6 and the spacer 7 is regulated.

The second step parts 73*a* and 73*b* are respectively parts for which the thickness of the spacer 7 changes by the amount of the projecting parts 43*a* and 43*b* of the ring member 4 described later. The projecting part 43*a* of the ring member 4 is inserted in the second step part 73*a*, and the projecting part 43*b* of the ring member 4 is inserted in the second step part 73*b*. Also, pins 731 are respectively formed projecting at the second step parts 73*a* and 73*b*. Each pin 731 is respectively fit into the recess part (guide hole) 431 of the projecting parts 43*a* and 43*b* of the ring member 4, and functions together with each recess part 431 as part of the regulating means 15.

As shown in FIG. 4, the projecting parts 75*a* and 75*b* are formed projecting on the back side surface 74 of the spacer 7.

The projecting part 75*a* and the projecting part 75*b* are arranged facing mutually opposite via the center axis of the spacer 7. Also, on the projecting parts 75*a* and 75*b* are respectively formed recess parts 751 for which a portion is made to be depressed (recessed). Then, pins 94 of the movement 9 are respectively fit into each recess part 751. As a result, the positional relationship of the spacer 7 and the movement 9 is regulated. In this way, the recess parts 751 of the projecting parts 75*a* and 75*b* respectively function as part of the regulating means 15.

As constituent materials for the spacer 7 and the ring member 4, though not specifically restricted, for example it is possible to use various metal materials or various resin materials. As shown in FIG. 3 and FIG. 4, the ring member 4 is arranged on the front side of the first dial 6. This ring member 4 is a member forming a ring shape along the outer circumference part 611 of the main unit part 61 of the first dial 6.

As shown in FIG. 2, with the ring member 4, the thickness gradually diminishes facing inward, and as a result, an inclined plane 41 is formed. On this inclined plane 41, it is possible to add a scale, for example. As a result, the ring member 4 can also have a function as a dial. Also, as shown in FIG. 4, projecting parts 43*a* and 43*b* are formed projecting on the back side surface 42 of the ring member 4. The projecting part 43*a* and the projecting part 43*b* are arranged facing opposite each other via the center axis of the ring member 4.

Also, a recess part 431 for which a part is depressed is formed respectively on the projecting parts 43*a* and 43*b*. Then, on each recess part 431, the pin 731 is fit onto the respective step parts 73*a* and 73*b* of the spacer 7. As a result, the positional relationship between the ring member 4 and the spacer 7 is regulated. As described previously, the positional relationship of the first dial 6 and the spacer 7 is regulated, and the positional relationship of the spacer 7 and the movement 9 is also regulated. Furthermore, the positional relationship of the ring member 4 and the spacer 7 is also regulated. In this way, via the spacer 7, the positional relationship of the first dial 6, the ring member 4, and the movement 9 is regulated collectively.

Also, as described previously, the positional relationship of the second dial 8 and the movement 9 is also regulated. Therefore, with the watch 1, the ring member 4, the first dial 6, the spacer 7, the second dial 8, and the movement 9 members are in a state reliably fixed to each other by the regulating means 15. As a result, these members slipping during use of the watch 1 is reliably prevented.

With the dial assembly 60 in an assembled state aligned as described above, as shown in FIG. 2, a space (space in which the miniature hand can move) 601 is formed enclosed by the first dial 6, the second dial 8, and the spacer 7. The 24-hour hand 104 and the day hand 105 are arranged within this space 601 and are in a held state. It is also possible to have the 24-hour hand 104 and the day hand 105 respectively rotated by the operation of the movement 9 in the space 601.

In this way, with the watch 1, with a simple constitution overlapping and assembling the first dial 6, the second dial 8, and the spacer 7, it is possible to reliably form the space 601 in which the 24-hour hand 104 and the day hand 105 can rotate. Also, the formed space 601 is of a size according to the position of the 24-hour hand 104 and the day hand 105. Specifically, if the 24-hour hand 104 and the day hand 105 are positioned at the same height, it is possible to have a dial assembly 60 with one spacer 7 placed as shown by the constitution in the drawing (this embodiment). In contrast to the constitution in the drawing, it is also possible to have a dial assembly 60 with a plurality of spacers 7 placed overlapping when one of the 24-hour hand 104 and the day hand 105 is at a position higher than the other. As a result, it is possible to expand the size of the space 601.

Second Embodiment

Figure 5:
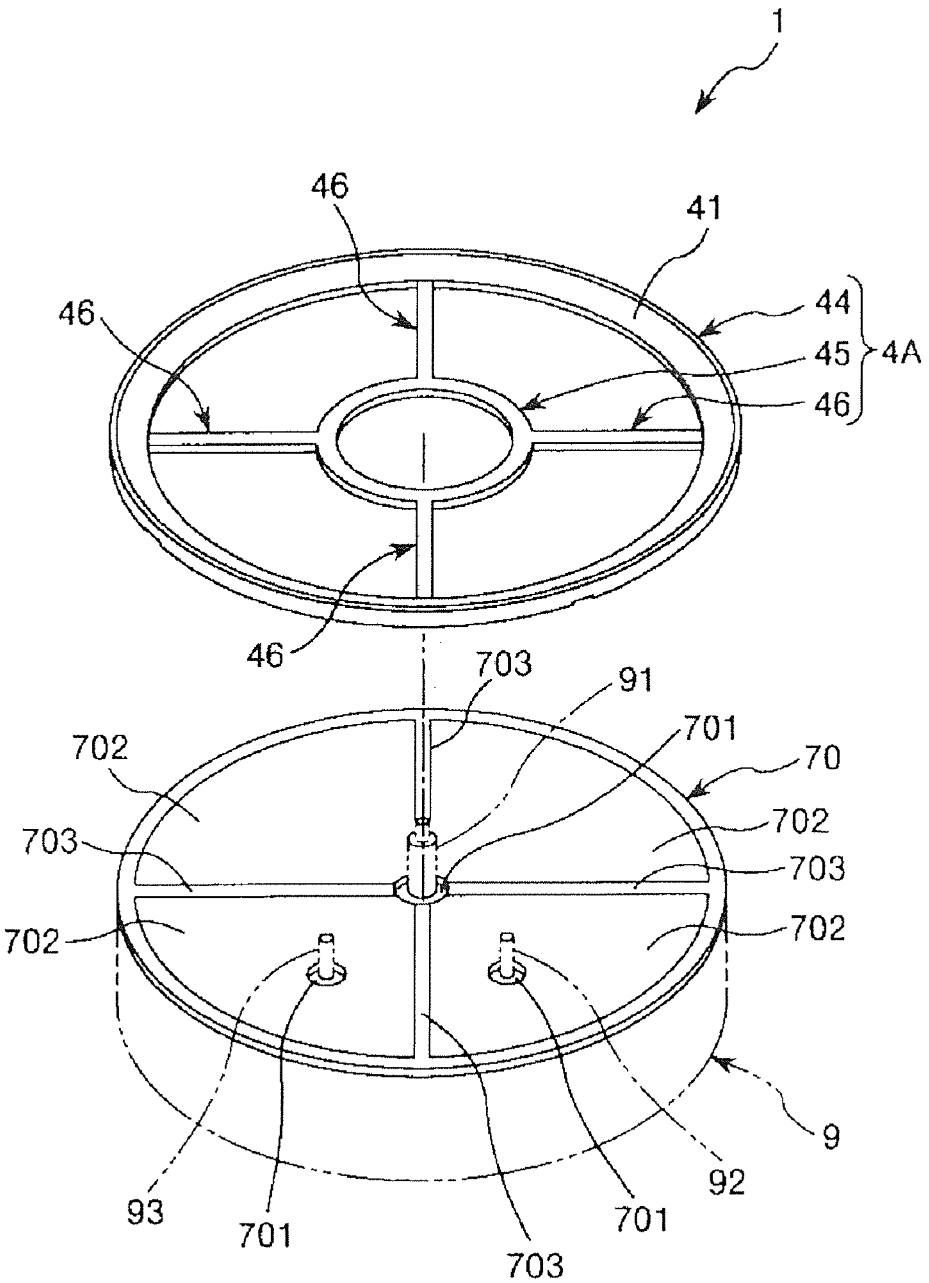
FIG. 5 is an exploded perspective view showing a second embodiment when the timepiece of the invention equipped with the dial assembly of the invention is applied to a wrist watch.

FIG. 5 is an exploded perspective view showing a second embodiment when the watch of the invention equipped with the dial assembly of the invention is applied to a wrist watch. With the dial assembly in FIG. 5, the second dial and the spacer are omitted. Following, we will describe the second embodiment of the dial assembly and the watch of the invention while referring to this drawing, the description will focus on the difference points from the previously described embodiment, and like items will be omitted from the description.

Other than that the ring member constitution is different, this embodiment is the same as the first embodiment. As shown in FIG. 5, the ring member 4A has an outside ring 44, an inside ring 45 arranged concentrically on the inside of the outside ring 44, and four rod-shaped connector parts 46 that connect the outside ring 44 and the inside ring 45. These connector parts 46 are arranged in radiating form.

Also, with the solar battery 70, the light receiving surface 702 on which light irradiated from the front surface is received is divided into a plurality of areas (four with the constitution shown in FIG. 5). For that reason, a linear boundary part 703 is respectively formed between adjacent light receiving surfaces 702 (areas). Each boundary part 703 is used as an electrode part of the solar battery 70. Also, with the watch 1, each connector part 46 can respectively face opposite the boundary part 703, specifically, can be overlapped on the boundary part 703 in plan view, and thus, it is possible to hide the boundary part 703. In this way, the connector part 46 also functions as a mask part for hiding the boundary part 703. With this mask part, the watch 1 appearance (aesthetic aspect) is improved, specifically, its aesthetic appeal is improved.

With this embodiment, the "mask part" is provided on the ring member 4A, but the invention is not limited to this, and for example it is also possible to provide it on at least one of the first dial 6, the second dial 8, the spacer 7, and the ring member 4A. Above, we described the dial assembly and watch of the invention with the embodiments in the drawings, but the invention is not limited to these, and each part constituting the dial assembly and the watch can be substituted with items of any constitution for which similar functions can be exhibited. It is also possible to add any structural items.

Also, the dial assembly and the watch of the invention can also be items for which any two or more of the constitutions (characteristics) of the aforementioned embodiments are combined. Also, with the second dial, the first display part and the second display part have mutually the same position in the thickness direction of the second dial with each of the embodiments, but the invention is not limited to this, and for example it is also possible to have mutually different positions in the thickness direction of the second dial.

What is claimed is:

1. A dial assembly held within a timepiece case together with a movement for which the hour hand and minute hand are supported to be able to rotate, which supports at least one miniature hand to be able to rotate at a position different from the hour hand and minute hand, the dial assembly comprising:

a first dial that is light transmissive, a second dial arranged on the back surface side of the first dial, and at last one ring-shaped spacer arranged between the first dial and the second dial such that the spacer surrounds an outer peripheral surface of the first dial, wherein the miniature hand rotates within a space enclosed by the first dial, the second dial, and the spacer.

2. The dial assembly according to claim 1, wherein the spacer has a step part of a different thickness, and the first dial is placed on that step part.

3. The dial assembly according to claim 1, wherein with the first dial, the hour hand and the minute hand fulfill indicating functions, and with the second dial, the miniature hands fulfill indicating functions.

4. The dial assembly according to claim 3, wherein the movement is an item that respectively supports two miniature hands to be able to rotate, and the second dial comprises a first display part for which one miniature hand of the two miniature hands performs indicating, and a second display part for which the other miniature hand performs indicating.

5. The dial assembly according to claim 3, wherein on the first dial, on the part that the first display part faces, a first opening part is formed piercing that concerned part, and on the part that the second display part faces, a second opening part is formed piercing that concerned part.

6. The dial assembly according to claim 1, wherein within the case, a solar battery is arranged on the back surface side of the second dial, and the second dial is light transmissive.

7. The dial assembly according to claim 1, comprising a ring member arranged on the front side of the first dial, and forming a ring shape along the edge part of the first dial.

8. The dial assembly according to claim 7, wherein within the case, on the back surface side of the second dial, a solar battery having a light receiving surface for receiving light is arranged, and the light receiving surface is divided into a plurality of areas, and at least one of the first dial, the second dial, the spacer, and the ring member has a mask part that in plan view overlaps the boundary part of adjacent areas.

9. The dial assembly according to claim 1, comprising regulating unit for regulating the mutual positional relationships of the first dial, the second dial, the spacer, and the movement.

10. A timepiece comprising:

the dial assembly according to claim 1, the movement for which the hour hand and minute hand are supported to be able to rotate, which supports the at least one miniature hand to be able to rotate at a position different from the hour hand and minute hand, and a case in which the dial assembly and the movement are held.

11. The dial assembly according to claim 2, wherein the spacer has a pin on the step part, with the pin being fitted into a cut-out of the first dial.

12. The dial assembly according to claim 7, wherein the spacer has a second step part of a different thickness and a second pin on the second step part, with the ring member being placed on the second step part such that the second pin is fitted into a recess part of the ring member.

* * * * *